(12) United States Patent
Bayrle et al.

(10) Patent No.: US 6,876,423 B2
(45) Date of Patent: Apr. 5, 2005

(54) LCD-CELL INCLUDING ONE SPACER EXHIBITING A DIMENSION AND A MATERIAL PROPERTY DIFFERENT FROM ANOTHER SPACERS DIMENSION AND MATERIAL PROPERTY

(75) Inventors: Reiner Bayrle, Langenau (DE); Otto Bader, Warthausen (DE); Thomas Bitter, Bad Ditzenbach (DE)

(73) Assignee: AEG Gesellschaft fur moderne Informationssyteme mbH, Ulm (DE)

( * ) Notice: Subject to any disclaimer, the term of this patent is extended or adjusted under 35 U.S.C. 154(b) by 0 days.

(21) Appl. No.: 10/128,069

(22) Filed: Apr. 23, 2002

(65) Prior Publication Data

US 2002/0171799 A1 Nov. 21, 2002

(30) Foreign Application Priority Data

Apr. 30, 2001 (DE) .......................................... 101 21 177

(51) Int. Cl.⁷ ............................................ G02F 1/1339
(52) U.S. Cl. ...................................... 349/155; 349/156
(58) Field of Search ................................... 349/155, 156

(56) References Cited

U.S. PATENT DOCUMENTS

| | | |
|---|---|---|
| 4,138,620 A | 2/1979 | Dickson |
| 4,824,215 A | 4/1989 | Joseph et al. |
| 4,832,457 A | 5/1989 | Saitoh et al. |
| 4,973,138 A * | 11/1990 | Yamazaki et al. ........... 349/157 |
| 5,054,890 A * | 10/1991 | Hanyu et al. ................ 349/155 |
| 5,056,893 A | 10/1991 | Holz et al. |
| 5,087,114 A * | 2/1992 | Fukui et al. ................. 349/157 |
| 5,164,853 A | 11/1992 | Shimazaki |
| 5,293,437 A | 3/1994 | Nixon |
| 5,337,068 A | 8/1994 | Stewart et al. |
| 5,394,165 A | 2/1995 | Sugiura |
| 5,661,531 A | 8/1997 | Greene et al. |
| 5,663,739 A | 9/1997 | Pommerenke et al. |
| 5,673,091 A | 9/1997 | Boisdron et al. |
| 5,686,979 A | 11/1997 | Weber et al. |
| 5,801,797 A | 9/1998 | Iida et al. |
| 5,812,232 A * | 9/1998 | Shiroto et al. ............... 349/157 |
| 5,838,405 A | 11/1998 | Izumi et al. |
| 5,851,411 A | 12/1998 | An et al. |
| 5,851,605 A | 12/1998 | Hisamitsu et al. |
| 5,867,140 A | 2/1999 | Rader |
| 5,903,328 A | 5/1999 | Greene et al. |

(Continued)

FOREIGN PATENT DOCUMENTS

| DE | 3633708 A1 | 4/1988 |
|---|---|---|
| DE | 3837313 A1 | 5/1989 |

(Continued)

OTHER PUBLICATIONS

ASTM (American Society for Testing And Materials) International, *Standard Test Method for Coefficient of Linear Thermal Expansion of Plastics Between –30°C and 30°C With a Vitreous Silica Dilatometer*, ASTM Designation: D 696–98 American Society for Testing and Materials, West Conshohocken, PA Copyright by the ASTM International Jul. 02, 12:56:14 2003.

(Continued)

*Primary Examiner*—Tarifur R. Chowdhury
(74) *Attorney, Agent, or Firm*—Dority & Manning, P.A.

(57) ABSTRACT

A liquid crystal display (LCD) cell is provided having transparent plates that are substantially parallel to each other and contain a liquid crystal display material. A plurality of spacers are interposed between the transparent plates to define a distance between the plates. At least one of the spacers exhibits dimensions and properties different than another of the spacers. The different dimensions and properties operate to control the distance at various temperatures to prevent non-uniform color effects and vacuum void formations.

32 Claims, 1 Drawing Sheet

U.S. PATENT DOCUMENTS

| | | | |
|---|---|---|---|
| 5,963,276 | A | 10/1999 | Inbar |
| 6,208,319 | B1 | 3/2001 | Nishida |
| 6,243,055 | B1 | 6/2001 | Fergason |
| 6,265,984 | B1 | 7/2001 | Molinaroli |
| 6,285,343 | B1 | 9/2001 | Brody |
| 6,307,612 | B1 * | 10/2001 | Smith et al. ............ 349/157 |
| 6,333,750 | B1 | 12/2001 | Odryna et al. |

FOREIGN PATENT DOCUMENTS

| | | |
|---|---|---|
| DE | 4203276 A1 | 4/1993 |
| DE | 4209072 A1 | 9/1993 |
| DE | 4244584 A1 | 7/1994 |
| DE | 29607786 U1 | 10/1996 |
| DE | 19653288 A1 | 6/1998 |
| DE | 19654440 A1 | 7/1998 |
| DE | 19710855 A1 | 10/1998 |
| DE | 19950839 A1 | 5/2001 |
| DE | 10023378 | 10/2001 |
| EP | 0402295 A1 | 4/1990 |
| EP | 0604719 A1 | 10/1993 |
| EP | 0731436 A1 | 9/1996 |
| EP | 0886259 A1 | 12/1998 |
| FR | 2713812 A1 | 6/1995 |
| JP | 61118789 | 6/1986 |
| JP | 03264921 | 11/1991 |
| JP | 03-293327 A * | 12/1991 |
| JP | 03296796 | 12/1991 |
| JP | 04149590 | 5/1992 |
| JP | 04212929 | 8/1992 |
| JP | 07020443 | 1/1995 |
| JP | 07128671 | 5/1995 |
| JP | 08015708 | 1/1996 |
| JP | 08304832 | 11/1996 |
| JP | 09160016 | 6/1997 |
| JP | 63-188118 A * | 8/1998 |
| JP | 11073127 | 3/1999 |
| WO | WO 09828731 | 7/1998 |
| WO | WO 09949503 | 9/1999 |

OTHER PUBLICATIONS

English–language Abstract for EP 0886259 A1.
English–language Abstract for JP 09160016.
English–language Abstract for JP 07128671.
English–language Abstract for JP 07020443.
English–language Abstract for EP 0604719 A1.
English–language Abstract for JP 04212929.
English–language Abstract for JP 04149590.
English–language Abstract for JP 03296796.
English–language Abstract for JP 03264921.
English–language Abstract for JP 61118789.
English language abstract for DE 3633708 A1 from esp@cenet.com.
English language abstract for DE 3837313 A1 from esp@cenet.com.
English language abstract for DE 4203276 A1 from esp@cenet.com.
English language abstract for DE 4244584 A1 from esp@cenet.com.
English language abstract for FR 2713812 A1 from esp@cenet.com.
Japanese Patent Abstract, Application No. 06149251, Application Date Jun. 30, 1994, Publication No. 08015708, Publication Date Jan. 19, 1996, European Patent Office.
Japanese Patent Abstract, Appl. No. 08144896, Application Date May 16, 1996, Publication No. 08304832, Publication Date Nov. 22, 1996, European Patent Office.
English language abstract for DE 19653288 A1 from esp@cenet.com.
English language abstract for DE 19654440 A1 from esp@cenet.com.
English language abstract for DE 19710855 A1 from esp@cenet.com.
Japanese Patent Abstract, Application No. 10112580, Application Date Apr. 23, 1998, Publication No. 11073127 A, Publication Date Mar. 16, 1999.
English language abstract for DE 19950839 A1 from esp@cenet.com.
English language abstract for DE 42 09 072 A1, from esp@cenet.com.
U.S. Appl. No. 2002/0026734, equivalent for DE–OS 100 23 378.3 A1.

* cited by examiner

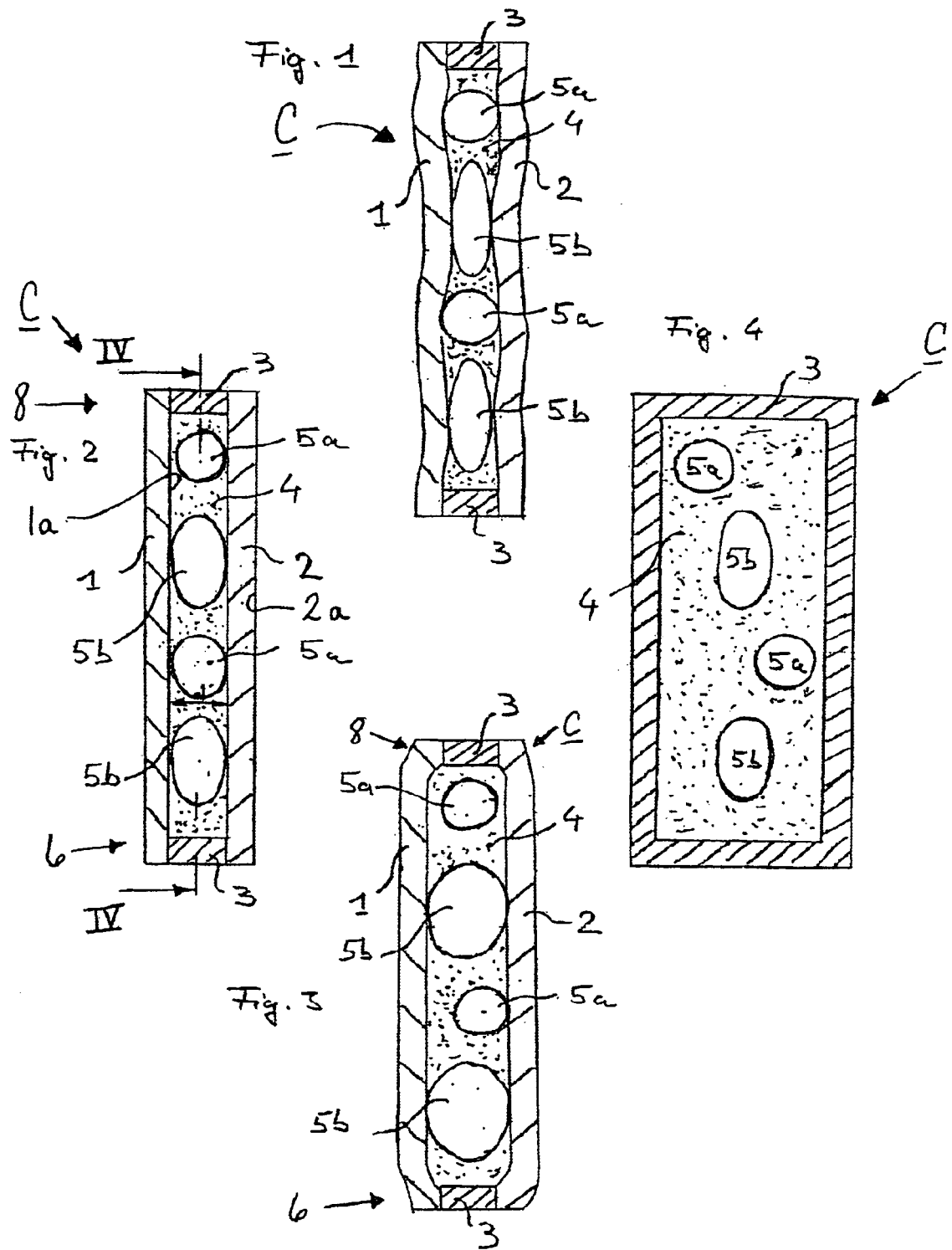

LCD-CELL INCLUDING ONE SPACER EXHIBITING A DIMENSION AND A MATERIAL PROPERTY DIFFERENT FROM ANOTHER SPACERS DIMENSION AND MATERIAL PROPERTY

FIELD OF THE INVENTION

The invention concerns a cell in a "Liquid Crystal Display" (hereinafter, "LCD"), the cell being especially adapted to LCD-panels, which operate in a wide temperature range.

BACKGROUND OF THE INVENTION

Mobile LCD presentations, such as may be found in buses or trains, as well as in stationary LCDs in depots, possess one or more electrically controllable LCD-cells. A single LCD-cell has, in such displays, two, parallel, transparent plates, one behind the other, between which a liquid crystal is captured. Electrodes are arranged on the plates, for example, as a transparent electrode coating, which can be comprised of a plurality of controllable elements. If a voltage is applied between the electrodes, that is, between the individual elements, then certain areas of the LCD-cell with either appear bright or as a "Normally Black Mode LCD", i.e., dark. Conversely, without applied potential, the areas will appear reversed as to bright and dark.

In the case of non-horizontally disposed LCD-cells, the liquid crystals collect, as a result of gravity, in a lower zone. In this case, first, the distribution of wall to wall distance inside the cells in a direction parallel to the two plates changes, and second, the transparent plates in the lower zone are pressed away from one another, but simultaneously draw together in the upper zone. The same holds true, of course, when inertial force is substituted for gravity force when horizontally or vertically mounted displays are accelerated. This leads to undesirable irregularities of the colors within areas of the display.

In order to prevent this, a known solution of the problem is that between the plates, transparent or dark spacers are inserted, which are mostly made of glass or plastic and are fastened between the two plates by means of an elastic adhesive material. This prevents an approach of one plate to the other in the upper zone as well as assuring an equalized distancing of one plate from the other in the lower zone. These spacer materials, however, when compared with liquid crystal, exhibit a heat expansion coefficient which is clearly, by an amount of one or two magnitudes, smaller than that of the liquid crystal. This may be expressed as $$\alpha = \frac{(V - V_o)}{[V(t - t_o)]}$$

wherein V and Vo represent the volumes of a body at the temperatures t and $t_o$, respectively.

If the LCD-cell warms, for instance from 20° C. to 85° C., then the liquid crystal expands itself essentially more than do the spacers and consequently presses the transparent plates away from one another. When this occurs, the spacers, which are adhesively affixed to the plates by at least one end are freed, that is, the spacers clamped between the plates are clearly relieved of pressure stress. Under these conditions, gravity causes the liquid crystals to settle, resulting in an expansion of the lower zone and relative thereto, also a narrowing of the upper zone, which again leads to an undesirable loss of uniformity of color at higher temperatures.

Conversely, if the LCD-cell cools within a range of from 20° C. to −30° C., then the liquid crystals contract to a greater extend than the spacers. On this account, the plates are unable to sufficiently follow the shrinking of the liquid crystals, whereby, in scattered locations, vacuum voids form in the liquid crystals, which produce a disturbing appearance. If, on the other hand, the spacers are so yielding that the possibility arises that their elastic contraction is commensurate with the diminishing volume of the liquid crystals, this brings about an undesirable macroscopic alteration of the thickness of the layer, that is, the distance apart of the two facing surfaces of the transparent plate, otherwise known as the "cell gap" of the LCD-cell.

If the spacers are not fastened by adhesion, but by flexible clamping between the two plates, then these spacers, upon vibration of the LCD-cell, approximately in the manner of a conventional vibration test, or in mobile operation, fall into micro-motions, which in turn lead to undesirable scratches on the surface of the transparent plates.

This problem is reinforced by operation at higher temperatures when the spacers, because the expansion of the LCD-cell are less strongly restrained.

BRIEF SUMMARY OF THE INVENTION

Thus, the invention creates an LCD-cell in which, within the variation of temperature through the operational range of temperature of the cell, color irregularities and vacuum voids scarcely appear and in which the vibrations of the LCD-cell almost never lead to scratching due to the spacers.

In an LCD-cell having a liquid crystal material in accord with the present invention, the spacers comprise first spacers and second spacers, which differentiate themselves from one another by their material properties and their geometrical dimensioning. By an appropriate distribution, based on location and amount, a structural strength variation by location and/or localized heat expansion characteristics can be created.

By localized structural strengths, the LCD-cell upon cooling can, in a localized manner, also flexibly follow the volume changes of the liquid crystal which obviates the generation of vacuum voids in the liquid crystal. Further, localized increased structural strength assure, on the macroscopic scale, a uniform layer thickness of the cell. A similar effect is achieved by localized heat expansion in which zones with greater heat expansion follow the movement of liquid crystals better and thus, again, the formation of vacuum voids is repressed, while areas having lesser heat expansion are assured a cell of uniform shape. Advantageously, both effects are interrelated, since localized structurally stronger areas show a smaller heat expansion and local yielding areas show greater heat expansion.

The location-related lesser and greater structural strengths with its accompanying difference in heat expansion as described above, can be achieved by the use of spacers made of different materials. For example, a first spacer of a material of higher structural strength would advantageously exhibit a smaller heat expansion coefficient α and show, at least in a direction perpendicular to inner surfaces of transparent plates forming in part the LCD-cell, a dimension which corresponds to the distance between the inner surfaces.

"Higher structural strength", in this connection, designates a greater module of compression, i.e., $$K = \left| \frac{\Delta p \cdot V}{\Delta V} \right|$$

where Δp is a variation of the pressure acting upon a body and ΔV represents a change of the volume V. Such first spacers could, for instance, be made out of glass and be fastened by adhesive to the inner surfaces of the transparent plates.

The second spacers are composed, advantageously, of a more elastic material (that is, with a lesser compression module K) with a greater heat expansion coefficient α, and exhibit, without deformation, even at the highest operational temperatures to which LCD cells are subjected, a dimension in a direction perpendicular to the two plates, which is clearly greater than is the existing separating distance of the inner surfaces of the two transparent plates. Such second spacers can, for example, be made of transparent or dark plastic materials and be fastened between the two transparent plates by an elastic, adherent material. By an appropriate spatial distribution of these first and second spacers in carefully chosen ratios, localized and differing structural strength and heat expansion zones between the two transparent plates can be created, and the LCD-cell shows, as presented above, even at the lowest temperatures, no vacuum voids nor macroscopic layer thickness changes. In addition to this, the first spacers, of greater structural strength, act to limit the amplitudes of vibrations of the LCD-cell.

A localized distribution of different structural strength and heat expansion properties, so achieved, is also advantageous in the case of higher temperature exposures, for example, upon heating, the liquid crystal extends itself strongly outwardly, and thus presses the two transparent plates away from each other. The more elastic second spacers follow this motion, but because of their greater dimensioning in their undeformed condition in the direction perpendicular to the two plates subsequently become clamped between the two plates. In this situation, the two plates carry out, during vibrations, no micro-movements, which would lead to scratches on the inner surfaces of the plates.

At the same time, these second spacers restrain the gravitational settling of the liquid crystals in the cell even under high temperature conditions. This is true, especially in the case of vertical placement or as a result of inertia. As described above, a more pronounced separation of the two plates in the lower cell zone always occasions a corresponding closure of the plates in the upper part. However, the now present second spacers restrain this reflex movement in the upper zone. Because of their dimensioning, in a direction transverse to the two plates, the second spacers are compressed. Thus, the elastic deformation of the second spacers contests the inward movement of the plates with a sufficient counter force to prevent any diminishing of the distance between the two plates. In this way, the cell cannot deform in such a manner that the liquid crystal sinks to the bottom. Consequently, at higher temperatures prevention is assured against a non-uniform coloring from settling, as well as against scratches on the inside surfaces of the plates from vibration.

Meanwhile, the first spacers, because of their smaller dimensioning in the direction perpendicular to the two plates, and because of their lesser heat expansion coefficients, cannot follow the nearly parallel movement of the plates away from one another in a direction perpendicular to the two plates and accordingly relates themselves on one side from one of the two plates. These first spacers, however, remain fixed by adhesion to the other plate, and in this way remain in their position. Because of their greater structural strength exerted in a direction perpendicular to the two plates, these first spacers serve at the same time advantageously as an amplitude limiting detent for the damping of vibration of the two parallel plates in a direction perpendicular thereto as a result of vibrations occurring within the LCD-cell.

Essentially, the invention also resembles a parallel installation of weak and strong springs in corresponding locations wherein the springs have differing spring strengths and/or heat expansions.

In this way, the invention exhibits a number of advantages:
  in higher temperature ranges, there are no irregularities in coloration of the LCD-presentations;
  in the lower temperature ranges no, or very little, vacuum voids occur;
  the macroscopic layer thickness of the LCD-cell changes itself very little at low temperatures;
  scratches by micro-movements of spacers, either by vibration of the cell as a result of vibration tests, mobile applications or the like, are avoided; and
  vibrations of the transparent plates in the lateral direction are reduced by an amplitude limiting detent.

Since the first spacers assure the mechanical stability of the LCD-cell, there are, as a whole, fewer spacers than are necessary with conventional LCD-cells, an advantage which allows the entire thickness of the spacers to be reduced. This not only reduces the costs of manufacture but also provides the following advantage. With each set of spacers, light is always dispersed or absorbed, and the orientation of the liquid crystal is disturbed. To correct this, the reduction of the entire thickness of the spacer leads to an improvement of the optical quality, in particular to an increase of contrast of the LCD-cell.

An advantageous embodiment of the invention can be found, in that the spacers are so chosen, that the majority of the first speakers, at least in the direction perpendicular to the two plates, have a smaller overall dimensioning that the majority of the second spacers. This distribution assures that most of the second spacers are always securely retained between the two plates.

For instance:

$$\mu_1 + i \cdot \sigma_1 < \mu_2 - i \cdot \sigma_2,$$

where $i=1, 2, 3$ and $\mu_1$ and $\mu_2$ are the average of the dimensions of the first or second spacers in the direction perpendicular to the two plates and $\sigma_1$ or $\sigma_2$ designate the corresponding variance.

BRIEF DESCRIPTION OF THE DRAWINGS

Further advantages, features and details are apparent from the detailed description below in combination with the drawings in which:

FIG. 1 is a longitudinal cross-sectional view through an LCD-cell in accord with an example of the invention in a case of a low temperature;

FIG. 2 is a longitudinal cross-sectional view through an LCD-cell in accord with an example of the invention in a case of an average temperature;

FIG. 3 is a longitudinal cross-sectional view through an LCD-cell in accord with an example of the invention in a case of a high temperature; and FIG. 4 is a longitudinal cross-sectional view through an LCD-cell in accord with an example of the invention along the section line IV—IV of FIG. 2.

The following detailed description uses numerical and letter designations to refer to features in the drawings. Like or similar designations in the drawings and detailed description have been used to refer to like or similar parts of the invention.

DETAILED DESCRIPTION OF THE INVENTION

Detailed reference will now be made to the drawings in which examples embodying the present invention are shown. The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation only and are not meant as limitations of the invention. The present invention thus includes any modifications and variations of the following examples as come within the scope of the appended claims and their equivalents.

In FIG. 2, an LCD-cell C encompasses two parallel transparent plates, 1 and 2. On the periphery of the plates is placed a seal 3. Within the so constructed cell is placed a liquid crystal material or liquid crystal 4, first spacers 5a and second spacers 5b. In the case of the average temperature, for example, 20° C. obtaining in FIG. 2, the dimensioning of the first structurally stronger spacers 5a in a direction perpendicular to the two plates 1, 2 essentially corresponds to a separating distance d between two facing inner surfaces 1a, 2a of the plates 1 and 2, respectively. The first spacers 5a are secured therein in an adhesive manner to at least one of the inner surfaces 1a, 2a of either plate 1 or 2.

The dimensioning of the second, more pliable spacer 5b in the direction perpendicular to the two plates 1, 2 is, in an undeformed condition of the spacers 5b, greater than this given separating distance d. Consequently, the spacers 5b, at average temperatures, are elastically deformed and hence clamped between the plates 1 and 2. The liquid crystal 4 will then, as a result of gravitation, settle toward a bottom direction or under zone 6, whereupon the plates 1 and 2 in the under zone 6 are internally pressed apart. This outward extension is prevented, in that in an upper zone 8, both the first and the second spacers 5a, 5b, in a direction perpendicular to the two plates 1, 2, exert a corresponding counter force against the first and second planes 1, 2, which, is comparable to spring forces. FIG. 4 shows, in a section along the line IV—IV of FIG. 2, a possible apportionment of the first and second spacers 5a and 5b in the liquid crystal 4.

If the LCD-cell C is cooled down, for instance to −30° C., then the liquid crystal 4, strongly contracts. As presented in FIG. 1, the LCD-cell can follow this reduction in volume of the liquid crystal 4, but is limited to those zones where the second spacers 5b are located, so that a vacuum void formation in the liquid crystal 4 is prevented. The second spacers 5b are then, in accord with their heat expansion, stronger than they were at average temperatures, but advantageously still deformable within their elastic limits.

In the zones with the first spacers 5a, these spacers, because of their lesser heat expansion coefficient α and their greater structural strength, essentially retain their shape and thus restrain a macroscopic layer thickness alteration of the LCD-cell C. Additionally, the first spacers 5a act as an amplitude limiting abutment in the case of vibrations of the two plates 1 and 2, in a direction perpendicular to the two plates 1, 2.

In FIG. 3, the LCD-cell C is subjected to a higher temperature, for instance, 85° C. Because of the heat expansion of the liquid crystal 4 in this case, the plates 1 and 2, in a direction perpendicular thereto, are forced away from each other. Because of the dimensioning of the second spacers 5b, in a direction perpendicular to the two plates 1, 2, and the heat expansion coefficients of the second spacers 5b, these spacers at this temperature are again elastically deformed and clamped between the plates 1 and 2. In this way, the second spacers 5b prevent, by directed elastic counter forces in a direction perpendicular to the two plates 1, 2, the approach of one plane to the other in the upper zone 8 as well as preventing a separation of the two plates 1, 2 from one another in the lower zone 6. In this way an increase in the layer thickness in the lower zone 6 with undesirable irregularities in the color characteristics is also prevented. The first spacers 5a, on the basis of their lesser heat expansion and high structural strength, one-sidedly loose themselves from either plate 1 or plate 2. Simultaneously, however, these first spacers 5a, by acting as an amplitude limiting detent, dampen the vibrations in the two plates 1, 2 as a result of vibrations in the LCD-cell C.

It will be apparent to those skilled in the art that various modifications and variations can be made in the present invention without departing from the scope and spirit of the invention. For example, specific shapes of various elements of the illustrated embodiments may be altered to suit particular applications. Thus, it is intended that the present invention include such modifications and variations as come within the scope of the appended claims and their equivalents. It is also to be understood that references herein to "under" and "upper" zones are intended solely for purposes of providing an enabling disclosure, and in no way suggest limitations regarding the operative orientation of the LCD-cell C or any components thereof.

What is claimed is:

1. An LCD-cell having transparent plates sealingly connected with a liquid crystal material disposed between the transparent plates, the LCD-cell comprising:

a plurality of spacers interposed between the transparent plates, at least one of the spacers exhibiting a first dimension and a first material property, at least one other spacer exhibiting a second dimension different from the first dimension and a second material property different from the first material property, the plurality of spacers cooperable to define a distance between inner surfaces of the transparent plates;

wherein a sum of an average value of a heated expansion of the at least one spacer perpendicular to the inner surfaces and a one to threefold variance thereof is smaller than a difference of an average value of a heated expansion of the at least one other spacer perpendicular to the inner surfaces and a one to threefold variance thereof expressed by the formula $$\mu_1 + i \cdot \sigma_1 < \mu_2 - i \cdot \sigma_2,$$

where $i=1, 2, 3$; $\mu_1$ and $\mu_2$ are the average of the dimensions of the spacers; and $\sigma_1$ and $\sigma_2$ designate variance.

2. The LCD-cell of claim 1, wherein the first dimension of the at least one spacer is substantially equal to the distance between the inner surfaces when the LCD-cell is at a temperature substantially equal to an external ambient temperature.

3. The LCD-cell of claim 1, wherein the first material properly has a greater structural strength than the liquid crystal material.

4. The LCD-cell of claim 3, wherein the greater structural strength is at least equivalent to a structural strength of glass.

5. The LCD-cell of claim 1, wherein the first material property has a heat expansion coefficient less than the liquid crystal material.

6. The LCD-cell of claim 1, wherein the at least one spacer is adhesively affixed on at least one of the inner surfaces.

7. The LCD-cell of claim 1, wherein the second dimension of the at least one other spacer is greater than the distance between the inner surfaces when the LCD-cell is heated to a temperature above an external ambient temperature.

8. The LCD-cell of claim 1, wherein the second material property has a structural strength less than the first material property.

9. The LCD-cell of claim 8, wherein the transparent plates are disposed substantially parallel to each other, the second material property exhibiting the lesser structural strength at least in a direction perpendicular to the transparent plates.

10. The LCD-cell of claim 1, wherein the second material property has a higher heat expansion coefficient than the first material property.

11. The LCD-cell of claim 1, wherein the plurality of spacers are interposed between the transparent plates such that the transparent plates exhibit a pre-determined elasticity.

12. The LCD-cell of claim 11, wherein the at least one spacer, upon cooling of the LCD-cell to a temperature less than an external ambient temperature, prevents a vacuum void formation in the liquid crystal material.

13. The LCD-cell of claim 1, wherein the plurality of spacers are interposed between the transparent plates such that the transparent plates exhibit a pre-determined heat expansion capability.

14. The LCD-cell of claim 1, wherein the plurality of spacers are dispersed in the liquid crystal material disposed between the transparent plates such that the at least one spacer is smaller than the at least one other spacer in a direction between the inner surfaces.

15. The LCD-cell of claim 14, wherein the plurality of spacers are a plurality of first spacers and a plurality of second spacers, the pluralities of first and second spacers dispersed in the liquid crystal material between the transparent plates such that a majority of the first spacers is smaller in the direction between the inner surfaces than a majority of the second spacers when the LCD-cell is at or above an external ambient temperature.

16. The LCD-cell of claim 1, wherein the plurality of spacers exhibit a reduced density in their entirety, the reduced density configured to reduce light dispersion and absorption and improve optical quality of the LCD-cell.

17. An LCD-cell having transparent plates sealingly connected with a liquid crystal material disposed between the transparent plates, the LCD-cell comprising:

a plurality of spacers interposed between the transparent plates, at least one of the spacers exhibiting a first dimension and a first material property, at least one other spacer exhibiting a second dimension different from the first dimension and a second material property different from the first material property, the plurality of spacers cooperable to define a distance between inner surfaces of the transparent plates;

wherein a sum of an average value of an expansion of the at least one spacer perpendicular to the inner surfaces and a variance thereof is smaller than a difference of an average value of an expansion of the at least one other spacer perpendicular to the inner surfaces and a variance thereof express by the formula:

$$\mu_1 + i \cdot \sigma_1 < \mu_2 - i \cdot \sigma_2,$$

where $i=1$; $\mu_1$ and $\mu_2$ are the average of the dimensions of the spacers; and $\sigma_1$ and $\sigma_2$ designate variance.

18. The LCD-cell of claim 17, wherein the first dimension of the at least one spacer is substantially equal to the distance between the inner surfaces when the LCD-cell is at a temperature substantially equal to an external ambient temperature.

19. The LCD-cell of claim 17, wherein the first material properly has a greater structural strength than the liquid crystal material.

20. The LCD-cell of claim 19, wherein the greater structural strength is at least equivalent to a structural strength of glass.

21. The LCD-cell of claim 17, wherein the first material property has a heat expansion coefficient less than the liquid crystal material.

22. The LCD-cell of claim 17, wherein the at least one spacer is adhesively affixed on at least one of the inner surfaces.

23. The LCD-cell of claim 17, wherein the second dimension of the at least one other spacer is greater than the distance between the inner surfaces when the LCD-cell is heated to a temperature above an external ambient temperature.

24. The LCD-cell of claim 17, wherein the second material property has a structural strength less than the first material property.

25. The LCD-cell of claim 24, wherein the transparent plates are disposed substantially parallel to each other, the second material property exhibiting the lesser structural strength at least in a direction perpendicular to the transparent plates.

26. The LCD-cell of claim 17, wherein the second material property has a higher heat expansion coefficient than the first material property.

27. The LCD-cell of claim 17, wherein the plurality of spacers are interposed between the transparent plates such that the transparent plates exhibit a pre-determined elasticity.

28. The LCD-cell of claim 27, wherein the at least one spacer, upon cooling of the LCD-cell to a temperature less than an external ambient temperature, prevents a vacuum void formation in the liquid crystal material.

29. The LCD-cell of claim 17, wherein the plurality of spacers are interposed between the transparent plates such that the transparent plates exhibit a pre-determined heat expansion capability.

30. The LCD-cell of claim 17, wherein the plurality of spacers are dispersed in the liquid crystal material disposed between the transparent plates such that the at least one spacer is smaller than the at least one other spacer in a direction between the inner surfaces.

31. The LCD-cell of claim 30, wherein the plurality of spacers are a plurality of first spacers and a plurality of second spacers, the pluralities of first and second spacers dispersed in the liquid crystal material between the transparent plates such that a majority of the first spacers is smaller in the direction between the inner surfaces than a majority of the second spacers when the LCD-cell is at or above an external ambient temperature.

32. The LCD-cell of claim 17, wherein the plurality of spacers is a mixture, consisting of the at least one spacer and the at least one other spacer, such that the density of spacers is reduced to yield improved optical characteristics.

* * * * *

UNITED STATES PATENT AND TRADEMARK OFFICE
CERTIFICATE OF CORRECTION

PATENT NO.   : 6,876,423 B2
DATED         : April 5, 2005
INVENTOR(S)  : Bayrle et al.

It is certified that error appears in the above-identified patent and that said Letters Patent is hereby corrected as shown below:

Column 7,
Line 2, change "properly" to -- property --

Column 8,
Line 14, change "properly" to -- property --

Signed and Sealed this

Nineteenth Day of July, 2005

JON W. DUDAS
*Director of the United States Patent and Trademark Office*